(12) United States Patent
Takahashi et al.

(10) Patent No.: US 7,395,903 B2
(45) Date of Patent: Jul. 8, 2008

(54) ELECTRIC BRAKE DEVICE

(75) Inventors: Kimio Takahashi, Tokyo (JP);
Kazuhiro Sekiguchi, Tokyo (JP);
Hideaki Takahashi, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 125 days.

(21) Appl. No.: 11/396,626

(22) Filed: Apr. 4, 2006

(65) Prior Publication Data
US 2006/0191753 A1    Aug. 31, 2006

Related U.S. Application Data

(62) Division of application No. 10/860,269, filed on Jun. 4, 2004, now abandoned.

(30) Foreign Application Priority Data
Jun. 6, 2003  (JP) .......................... P.2003-161752

(51) Int. Cl.
*F16D 55/08* (2006.01)
(52) U.S. Cl. .................. 188/72.1; 188/335; 188/73.1
(58) Field of Classification Search ................ 188/72.1, 188/73.1, 71.1, 71.4, 72.9, 1.11 E, 335; 310/800
See application file for complete search history.

(56) References Cited

U.S. PATENT DOCUMENTS

| 5,499,701 | A  |   | 3/1996  | Harinaga |
| 6,176,352 | B1 |   | 1/2001  | Maron et al. |
| 6,213,564 | B1 | * | 4/2001  | Face, Jr. ................... 188/72.1 |
| 6,374,958 | B1 |   | 4/2002  | Usui et al. |
| 6,412,608 | B1 | * | 7/2002  | Mohr et al. ................ 188/72.9 |
| 6,450,588 | B2 | * | 9/2002  | Grote et al. ............ 188/1.11 E |
| 6,545,384 | B1 |   | 4/2003  | Pelrine et al. |
| 6,812,624 | B1 |   | 11/2004 | Pei et al. |

FOREIGN PATENT DOCUMENTS

| JP | A-55-123029  | 9/1980  |
| JP | A-59-050234  | 3/1984  |
| JP | A-01-044820  | 12/1989 |
| JP | A-60-136629  | 7/1995  |
| JP | A-09-100849  | 4/1997  |
| JP | A-10-504876  | 5/1998  |
| JP | A-2001-286162 | 10/2001 |
| JP | A-2003-506858 | 2/2003  |

OTHER PUBLICATIONS

Electric Packaging Technology, "Dielectric elastomer for MEMS and NEMS/EPAM technology and development from now on." vol. 18, No. 1 (2002), pp. 32-38.

* cited by examiner

*Primary Examiner*—Melanie Torres
(74) *Attorney, Agent, or Firm*—Morgan, Lewis & Bockius LLP

(57) ABSTRACT

An actuator 23*d* for pushing a plurality of friction plates 44, 44 to a plurality of plates 37, 37 to be braked is composed of members including electroactive polymer, the shape of the elastomer of which is changed by electric energy.

2 Claims, 16 Drawing Sheets

US 7,395,903 B2

ELECTRIC BRAKE DEVICE

This is a divisional application of application Ser. No. 10/860,269, filed on Jun. 4, 2004, now abandoned which is hereby incorporated by reference.

BACKGROUND OF THE INVENTION

The present invention relates to improvements in an electric brake device, which is used for braking a vehicle, especially for braking an automobile, which generates a braking force by utilizing electric energy such as voltage and electric current.

Concerning the brake device for braking a vehicle, various types of brake devices have been developed and put into practical use. Especially, concerning the brake device used for braking an automobile, a hydraulic brake device, in which a braking force is generated by hydraulic pressure, is widely used. Concerning this hydraulic brake device, for example, a disc brake described in JP-A-55-123029 or a drum brake described in JP-A-09-100849 is widely used. A drum type caliper brake described in JP-A-59-050234 is used in some fields. In order to generate a stronger braking force, a multiple plate type disc brake device described in JP-Y-01-044820 has been conventionally proposed.

Since highly sophisticated control is applied to a vehicle recently, various types of electric brake devices, in which a braking force is generated by electric energy, have been proposed. The electric brake device is advantageous as follows. When the electric brake device is adopted, it is unnecessary to provide a master cylinder, a booster and hydraulic pipes, which need large spaces for installation, and further the manufacturing costs of which are high. Accordingly, the costs can be reduced and further the electric brake device can be easily installed. Furthermore, a period of time from when a driver has stepped on the brake pedal to when a braking force is generated can be reduced. Furthermore, sophisticated control can be conducted in order to maintain stability of running.

As an electric brake device which has been developed in the above circumstances, for example, a direct driven actuator type electric brake device described in JP-A-60-136629 is known. Alternatively, a rotary motor type electric brake device described in JP-A-10-504876 is known. Concerning the direct driven actuator type electric brake device, in addition to the electric brake device described in JP-A-60-136629 in which piezoelectric ceramic is used, it is possible to use an electric brake device in which a linear motor is used. On the other hand, concerning the rotary motor type electric brake device described in JP-10-504876, it is possible to use an electric brake device in which a rotary motion of an electric motor is converted into a linear motion by a feed screw mechanism and others.

On the other hand, an invention about electroactive polymer, the shape of which is changed by electric energy, is described in JP-A-2001-286162 and JP-A-2003-506858 and Non-patent Document 1 (Dielectric elastomer for MEMS and NEMS/EPAM technology and development from now on, by Masatake Chiba, pages 32 to 38, Vol. 18. No. 1 of "Electronic Packaging Technology" published by K. K. Gijyutsu Chosa Kai on Dec. 20, 2001). As described in the paragraph [0008] of the specification of JP-A-2001-286162, this electroactive polymer is composed and operated as follows. A pair of electrodes are provided on both sides of a plate-shaped elastomer polymer EP. When a voltage impressed between both the electrodes is adjusted, the elastomer polymer EP is expanded and contracted. JP-A-2001-286162 and JP-A-2003-506858 suggest the use of the above electroactive polymer for driving a portion to be driven of a valve device, a pump device, a robot or an artificial organ. Non-patent Document 1 introduces an artificial muscle in which an electroactive high polymer is used. According to the introduction of Non-patent Document 1, the performance of this artificial muscle is high in such a manner that the efficiency is high and the distortion is not less than 300%, the drive pressure is 8 MPa and the response time is not more than 0.5 ms.

In the electric brake device described in JP-A-60-136629 in which the actuator is made of piezoelectric ceramics, the following problems may be encountered. It is possible to increase a pushing force generated by the actuator. However, it is difficult to ensure a quantity of deformation of the actuator in the pushing direction. Therefore, when the pushing force is set at a high intensity at the time of applying the brake, it is impossible for the actuator to be deformed to be a sufficiently small size at the time when braking is not conducted, and the rotary member and the friction member are rubbed on each other. Therefore, it is difficult to obtain a high intensity of braking force while dragging of the rotary member and the friction member is being prevented. The occurrence of dragging is not preferable, because the running performance such as a fuel consumption or acceleration is deteriorated. On the other hand, in the case of an actuator in which a linear motor is used, it is possible to ensure a quantity of deformation, while the occurrence of dragging is being prevented. However, it is impossible to endure a sufficiently high pushing force.

On the other hand, in the rotating motor type electric brake device described in JP-A-10-504876, it is possible to make obtaining of a sufficiently high pushing force be compatible with obtaining of a sufficiently large quantity of deformation. However, the number of parts is so large that the weight and the volume are increased. Further, in the case of applying the brake, frictional engagement and elastic deformation are caused in a large number of portions. Therefore, the efficiency is so low that energy can not be effectively utilized.

In JP-A-2001-286162, JP-A-2003-506858 and Non-patent Document 1, various descriptions are made about the use of electroactive polymer characterized in that a quantity of deformation is large and the energy conversion efficiency is high. However, it is considered that this electroactive polymer is applied to an actuator used for a conveyer, an opening and closing device for a door and a movable portion of a robot (For example, refer to page 35 of Non-patent document 1).

SUMMARY OF THE INVENTION

It is an object of the present invention to provide a small electric brake device, the efficiency of which is high, by utilizing the above electroactive polymer.

In order to achieve the object, an electric brake device of the present invention comprises: a rotating body rotating together with a wheel; a friction member provided being opposed to the rotating body; and an electric actuator for pressing the friction member against a braking surface of the rotating body.

In the electric brake device of the present invention, the actuator includes an electroactive polymer, the shape of the elastomer of which is changed by electric energy.

In the electric brake device of the present invention composed as described above, when an electric current supplied to the electroactive polymer is controlled, a shape of the polymer composing the electroactive polymer is changed, so that an intensity of the pushing force of the actuator, by which a friction member is pushed to a braking surface of a rotating body, is increased or decreased or canceled. The energy conversion efficiency of the above electroactive polymer is high, and the structure of the actuator composed of this electroactive polymer is simple, small and highly effective. Further, electric energy can be effectively utilized. Therefore, it is possible to obtain a high intensity of braking force by a small intensity of electric energy. Furthermore, since a quantity of deformation of the electroactive polymer is large, it is possible to prevent the friction member and the braking surface of the rotating body from rubbing on each other.

BRIEF DESCRIPTION OF THE DRAWINGS

FIGS. 15A and 15B are enlarged upper views of FIG. 12, in which FIG. 15A shows a state of not applying the brake and FIG. 15B shows a state of applying the brake are shown.

FIGS. 16A and 16B are views showing the ninth embodiment of the present invention, in which FIG. 16A shows a state of not applying the brake and FIG. 16B shows a state of applying the brake are shown.

DESCRIPTION OF THE PREFERRED EMBODIMENTS

First Embodiment

Figure 1:
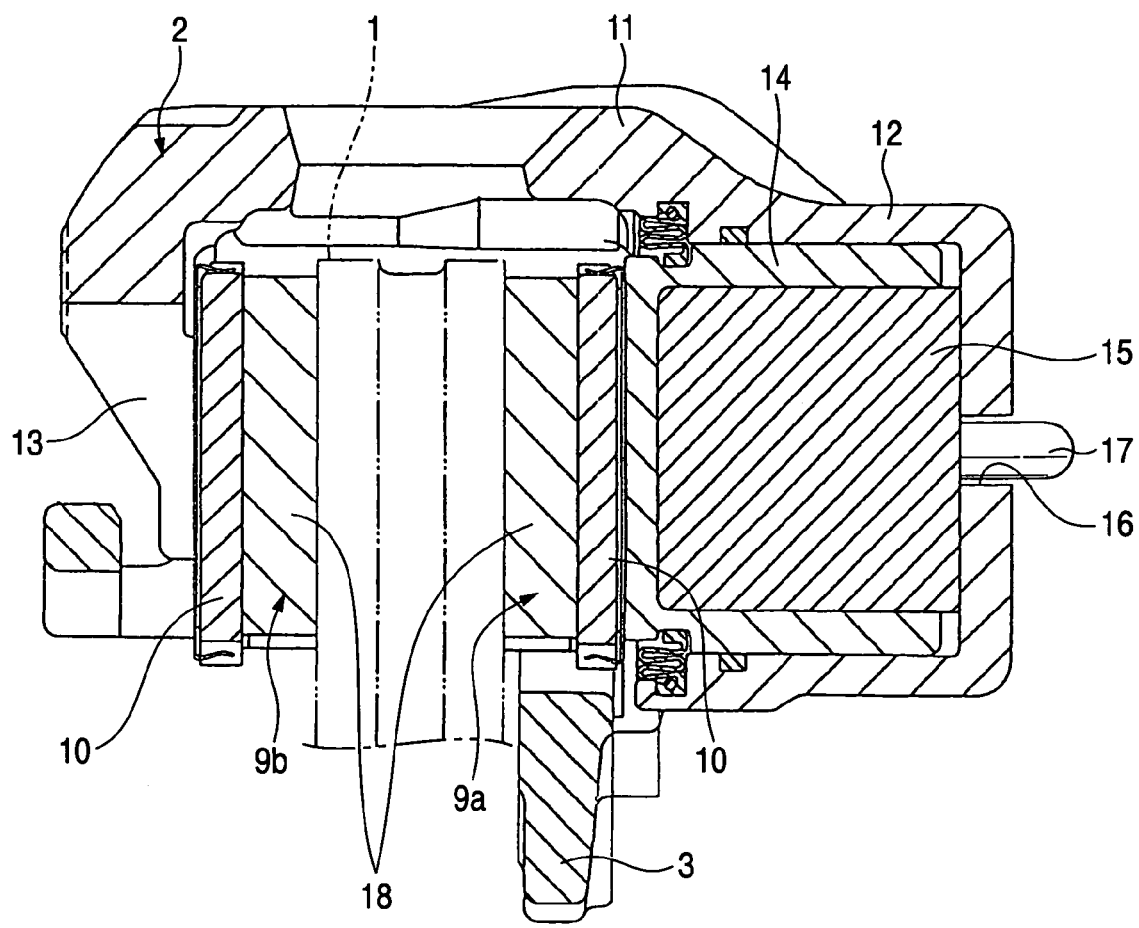
FIG. 1 is a sectional view showing the first embodiment of the present invention.
Figure 2:
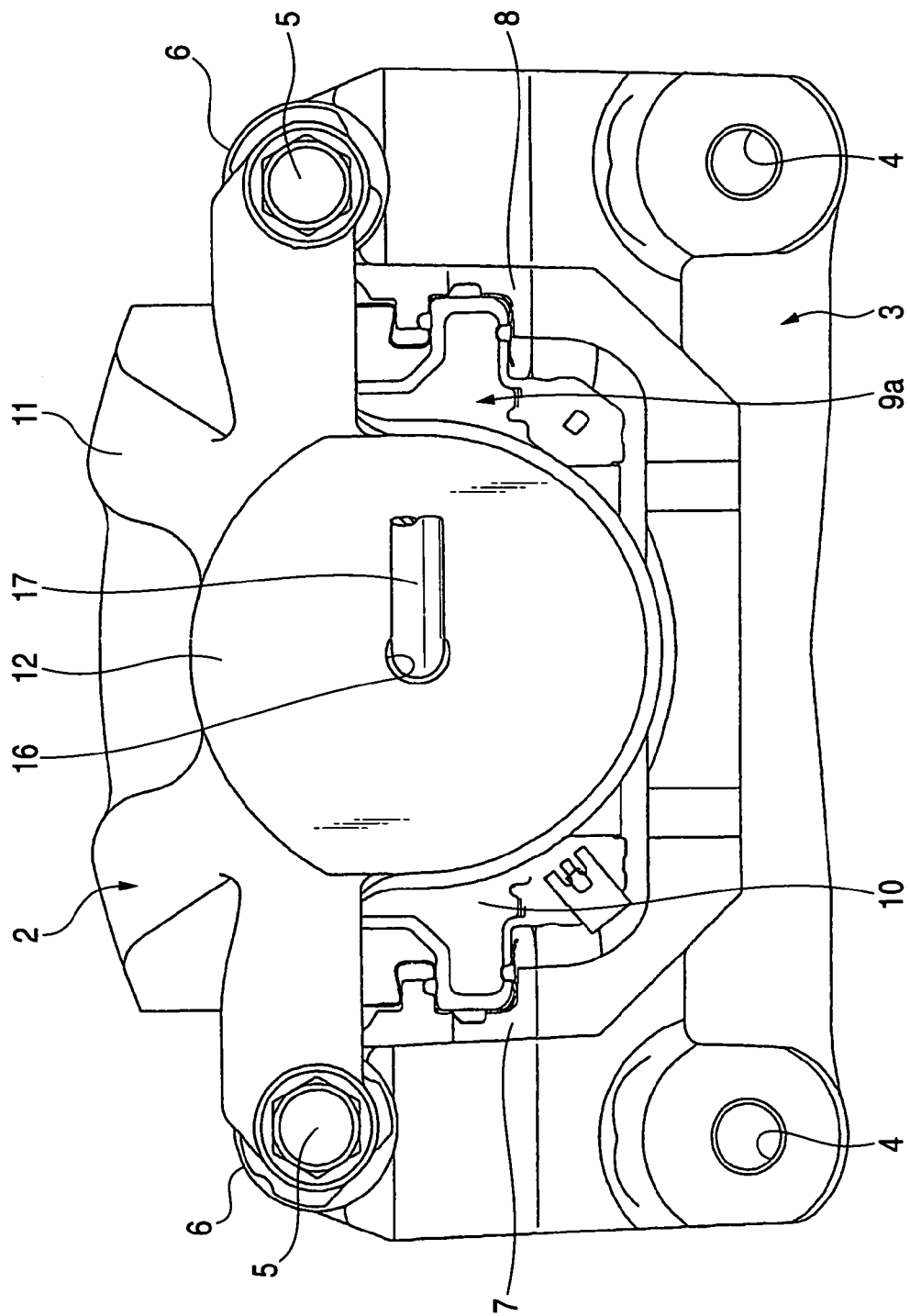
FIG. 2 is a view taken from the right in FIG. 1.

FIGS. 1 and 2 are views showing the first embodiment of the present invention. In this embodiment, the disc-shaped rotor 1, which is concentrically connected and fixed to a wheel, is used as a rotating body. In this embodiment, the present invention is applied to a disc brake which is called a floating caliper type disc brake. At the time of braking, the caliper 2 is displaced with respect to the rotor 1 rotating together with a wheel (not shown). When this disc brake is incorporated into a vehicle, the support member 3, which is provided adjacent to one side of the rotor 1, is fixed to a vehicle body (suspension not shown) by utilizing the attaching holes 4, 4. This support member 3 supports the caliper 2 in such a manner that the caliper 2 can be displaced in the axial direction of the rotor 1. Therefore, concerning the rotating direction of the rotor 1, a pair of guide pins 5, 5 are arranged at both end portions of the caliper 2 in parallel to the central shaft of the rotor 1, and both the guide pins 5, 5 are slidably inserted in the axial direction into the guide holes provided in the guide portions 6, 6 provided at both end portions of the support member 3.

In both end portions of the support member 3 and at positions distant from each other in the circumferential direction of the rotor 1, the entry side engaging portion 7 and the delivery side engaging portion 8 are respectively provided. A forward end portion of each engaging portion 7, 8 is bent into a U-shape so that the engaging portion can cross an outer circumferential portion of the rotor 1 in the vertical direction of FIGS. 1 and 2. Both end portions of the liners 10, 10 composing the pads 9a, 9b are engaged with both the engaging portions 7, 8 in such a manner that both end portions of the liners 10, 10 can be slid in the axial direction of the rotor 1. There is provided a caliper 2 having a cylinder portion 12 and a pawl portion 13 which are connected with each other by the bridge portion 11 crossing the pads 9a, 9b. The piston 14 to push the inner side pad 9a against the rotor 1 is movably engaged in the cylinder portion 12 of the caliper 2 in such a manner that the piston 14 can be freely moved in the axial direction. (In this case, the inner side means the inner side of the vehicle in the width direction, that is, the inner side means the right in FIG. 1.)

Between the piston 14 and the inner end face of the cylinder portion 12, the actuator 15 made of electroactive polymer is arranged. This actuator 15 is composed as follows. Each electroactive polymer sheet is composed in such a manner that both sides of a plate-shaped elastomer polymer EP are interposed between a pair of electrodes. A plurality of the electroactive polymer sheets are put on each other under the condition that the expanding and contracting directions of the electroactive polymer are made to agree with the axial direction (the lateral direction of FIG. 1) of the piston 14.

In order to supply an electric current to the electrodes of each electroactive polymer composing the actuator 15 as described above, the cable 17 is inserted into the through-hole 16 formed in the inner side end portion of the caliper 2. Therefore, each electrode can be freely electrified by this cable 17. The length of the actuator 15 in the axial direction of the rotor 1 can be freely adjusted when an electric current supplied to each electrode is controlled via the cable 17 so that the elastomer polymer EP can be expanded and contracted.

In the case of applying the brake, an electric current is supplied to the electroactive polymer composing the actuator 15, and the length of the actuator 15 composed of the electroactive polymer in the axial direction of the rotor 1 is increased. As a result, the piston 14 is displaced being pushed out from the cylinder 12. This piston 14 pushes the friction member 18 of the pad 9a on the inner side against the inner side of the rotor 1 from the right to the left in FIG. 1. Then, as a reaction of this pushing motion, the caliper 2 is displaced to the right in FIG. 1 according to the slide of both guide pins 5, 5 in the guide holes formed in both guide portions 6, 6. Therefore, the pawl 13 pushes the friction member 18 of the pad 9b on the outside (outside of the vehicle in the width direction, that is, on the left in FIG. 1) against the outside of the rotor 1. As a result, the rotor 1 is strongly pinched from both sides and the brake can be applied. In order to adjust an intensity of the braking force, an intensity of the electric current supplied to the electrode of the electroactive polymer is controlled. In the case of releasing the brake, the supply of an electric current to the electroactive polymer is stopped. In this connection, in the case where no brake is applied, the piston 14 is pulled into the cylinder 12 by an elastic restoring force of the seal member engaged with the inner circumferential face of the cylinder 12, so that rubbing of the friction members 18, 18 and both sides of the rotor 1 can be prevented.

Second Embodiment

Figure 3:
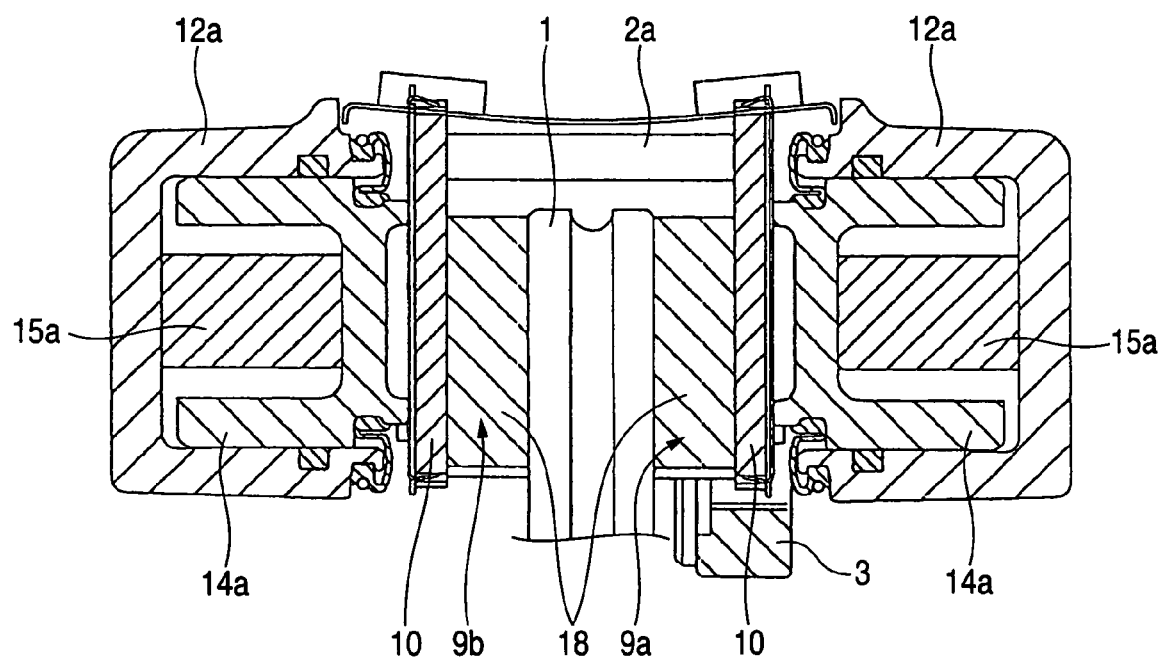
FIG. 3 is a sectional view showing the second embodiment of the present invention.

Next, FIG. 3 is view showing the second embodiment of the present invention. In this embodiment, the disc-shaped rotor 1, which is concentrically connected and fixed to a wheel, is also used as a rotating body. In this embodiment, the present invention is applied to a disc brake called an opposed piston type disc brake. At the time of applying the brake, the pistons 14a, 14a, which are arranged on both sides of the rotor 1 being opposed to each other, are moved forward with respect to the rotor 1 rotating together with a wheel (not shown). The caliper 2a is not displaced in the axial direction of the rotor 1. In this embodiment, the actuators 15a, 15a made of electroactive polymer are arranged between the pistons 14a, 14a and the inner end faces of the cylinders 12a, 12a provided in the caliper 2a. At the time of applying the brake, the electrodes of the electroactive polymer composing both the actuators 15a, 15a are electrified, so that both the actuators 15a, 15 are synchronously extended. Other points of the structure and action of this embodiment are the same as those of the first embodiment described before.

Third Embodiment

Figure 4:
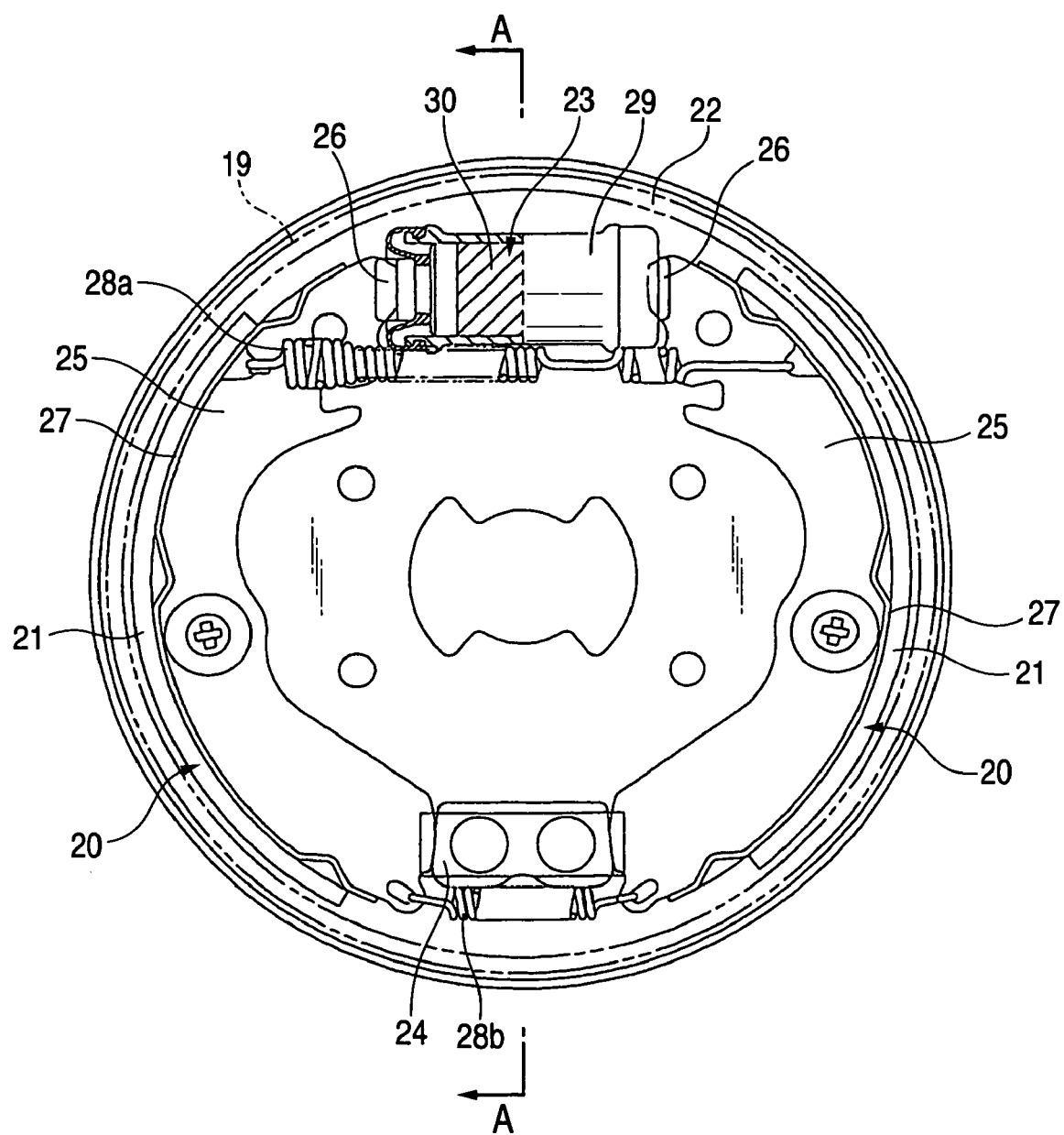
FIG. 4 is a partially cutaway front view showing the third embodiment of the present invention.
Figure 5:
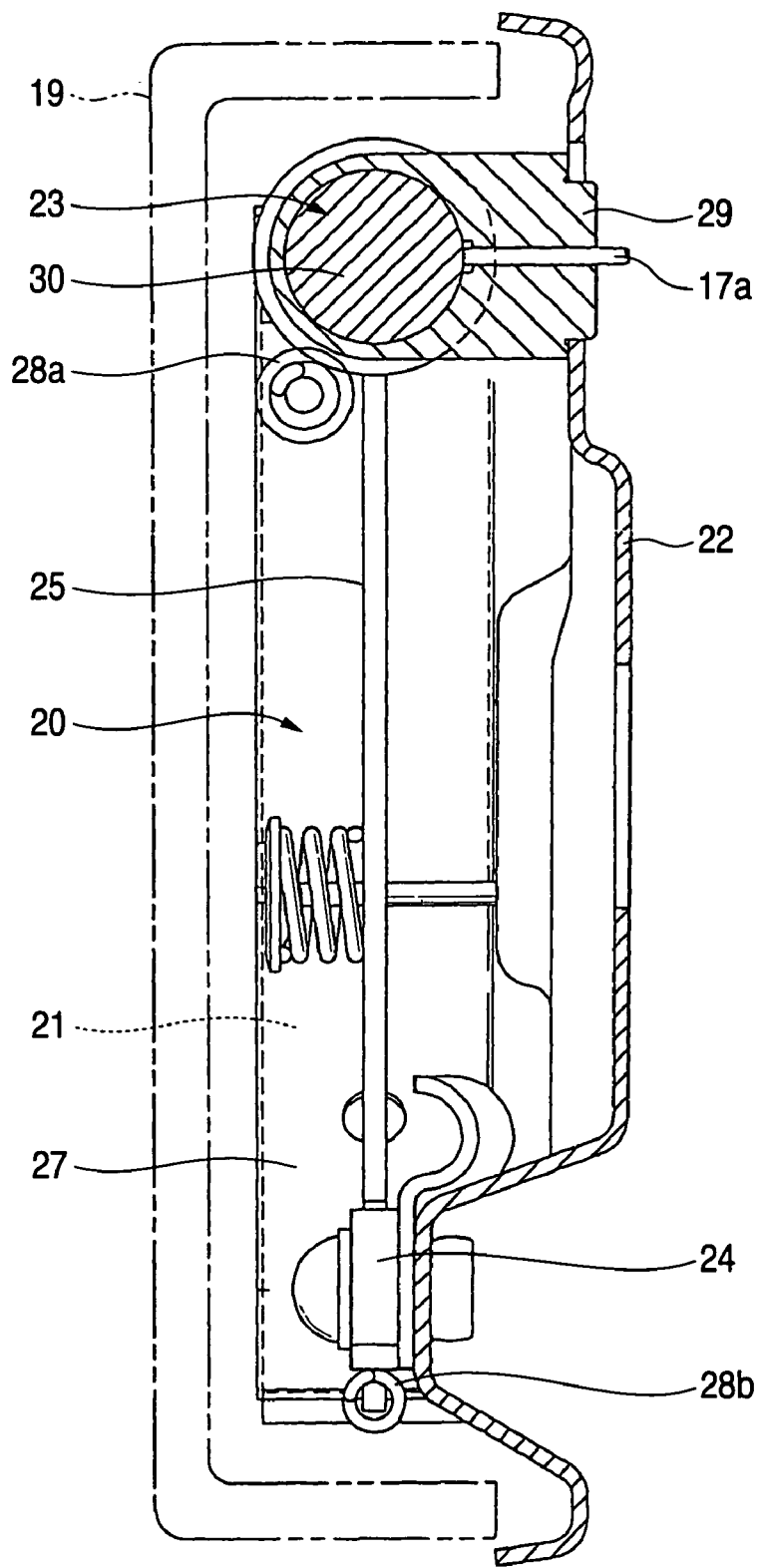
FIG. 5 is a sectional view taken on line A-A in FIG. 4.

Next, FIGS. 4 to 5 are views showing the third embodiment of the present invention. In this embodiment, the cylindrical drum 19 having a bottom, that is, the cylindrical drum 19, which is a petri-dish-shaped drum, which is concentrically connected to a wheel, is used as a rotor for braking. In this embodiment, the present invention is applied to a drum brake called a leading trailing shoe brake. At the time of applying the brake, the outer circumferential faces of the arcuate friction members 21, 21 provided on a pair of brake shoes 20, 20 are pushed against the inner circumferential face of the drum 19 rotating together with a wheel (not shown).

In this structure, the actuator 23 and the anchor member 24 are fixed onto the front face (the outer face in the width direction of an automobile) of the backing plate 22, which is not rotated being supported by a vehicle body (suspension not shown), at positions opposed to each other in the radial direction. One end portions of both end portions in the circumferential direction of the webs 25, 25 composing the brake shoes 20, 20 collide with a pair of outputting members 26, 26 composing the actuator 23, and the other end portions collide with the anchor member 24. The friction members 21, 21 are attached to the outer circumferential faces of the liners 27, 27 fixed to the outer circumferential edges of the webs 25, 25. The return springs 28a, 28a are provided between both the webs 25, 25, so that both the webs 25, 25 can be given an elastic force directed inside in the radial direction of the backing plate 22. The drum 19 is arranged in such a manner that the drum 19 covers both the brake shoes 20, 20, and the inner circumferential face of the drum 19 is opposed to the outer circumferential faces of the friction members 21, 21.

In this embodiment, in order to compose the actuator 23, the cylindrical housing 29 is fixed at a position on the front face of the backing plate 22 close to the outer diameter. The electroactive polymer 30, which is arranged at an intermediate portion in the axial direction (the lateral direction of FIG. 4) of the housing 29, is interposed between the pair of outputting members 26, 26. These outputting members 26, 26 are engaged in the housing 29 in such a manner that the outputting members 26, 26 can be freely displaced in the axial direction of the housing 29. An electric current can be freely supplied to the electroactive polymer 30 via the cable 17a.

In the present embodiment composed as described above, when the brake is not applied, an electric current is not supplied to the electroactive polymer 30. Therefore, this electroactive polymer 30 is contracted in the axial direction. In this state, the pair of brake shoes 20, 20 are displaced inward in the radial direction of the backing plate 22 by the elastic forces of the return springs 28a, 28b, and the inner circumferential face of the drum 19 is separated from the outer circumferential faces of the friction members 21, 21. The pair of outputting members 26, 26 composing the actuator 23 are pushed into the housing 29, and an interval of the outputting members 26, 26 is reduced.

On the other hand, when an electric current is supplied to the electroactive polymer 30 so as to apply the brake, the electroactive polymer 30 is extended in the axial direction, and an interval of the pair of outputting members 26, 26 composing the actuator 23 is extended. As a result, the pair of brake shoes 20, 20 are displaced outward in the radial direction of the backing plate 22 resisting the elastic forces of the return springs 28a, 28b. Therefore, the inner circumferential face of the drum 19 comes into contact with the outer circumferential faces of the friction members 21, 21.

Fourth Embodiment

Figure 6:
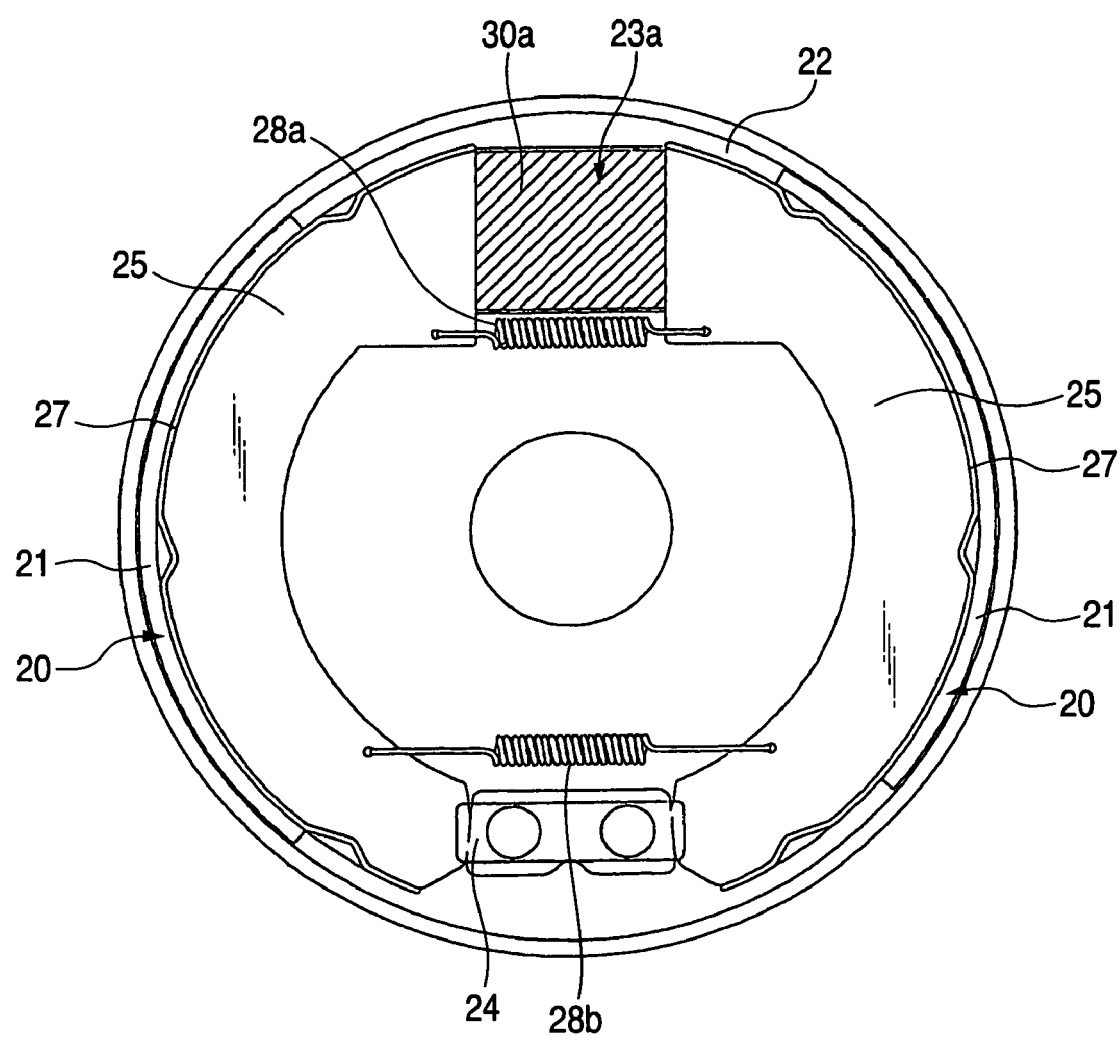
FIG. 6 is a substantially front view showing the fourth embodiment of the present invention.

Next, FIG. 6 is a view showing the fourth embodiment of the present invention. In this embodiment, the actuator 23a, which is provided between the end portions in the circumferential direction of a pair of brake shoes 20, 20, is composed of only the electroactive polymer 30a. In other words, the structure of this embodiment is composed in such a manner that the housing 29 and the outputting members 26, 26 are omitted from the structure of the third embodiment described before. Other points of the structure and the action are the same as those of the third embodiment described before.

Fifth Embodiment

Figure 7:
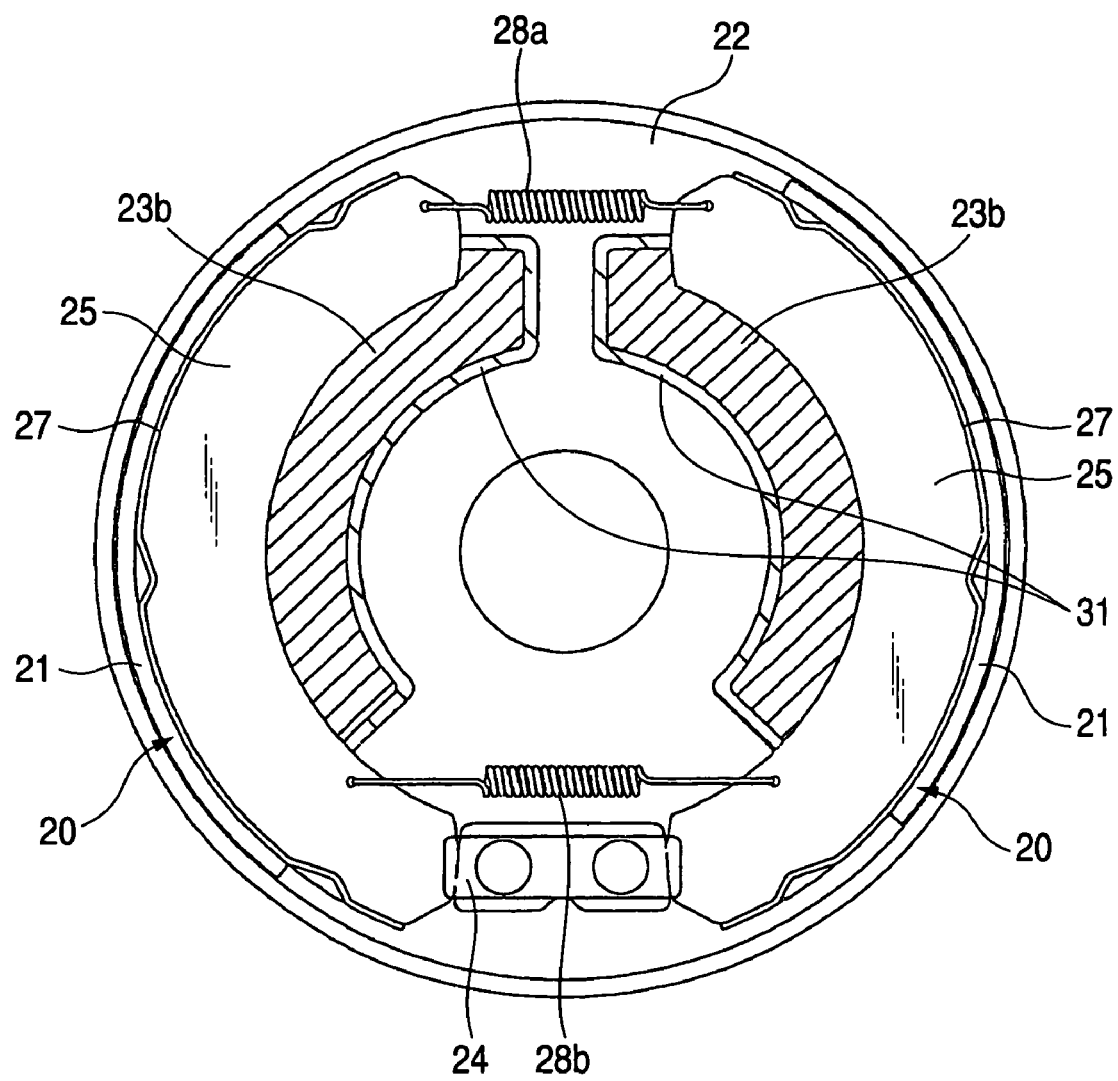
FIG. 7 is a substantially front view showing the fifth embodiment of the present invention.

Next, FIG. 7 is a view showing the fifth embodiment of the present invention. In this embodiment, the anchor wall portions 31, 31 are arranged being fixed by means of a connecting member such as a bolt or by means of welding to the backing plate 22 at positions on the front face of the backing plate 22 closer to the center of the backing plate 22 than the pair of brake shoes 20, 20. In the embodiment shown in the drawing, each anchor wall portion 31, 31 is provided in a portion from one end edge of the web 25, 25 composing each brake shoe 20, 20 to the other end portion of the inner circumferential edge in the circumferential direction. Between the outer circumferential face of each anchor wall portion 31, 31 and the inner circumferential edge of each web 25, 25, the actuator 23b, 23b made of electroactive polymer is arranged.

In this embodiment, the expanding and contracting direction of the electroactive polymer composing the actuators 23b, 23b is made to coincide with the radial direction (the circumferential direction in the case of a portion opposing to one end edge of the web 25, 25 in the circumferential direction) of the backing plate 22. Therefore, according to the control of an electric current supplied to the electroactive polymer via a cable not shown, the width of both the actuators 23b, 23b in the radial direction of the backing plate 22 can be freely adjusted. Other points of the structure and the action are the same as those of the third embodiment described before.

Sixth Embodiment

Figure 8:
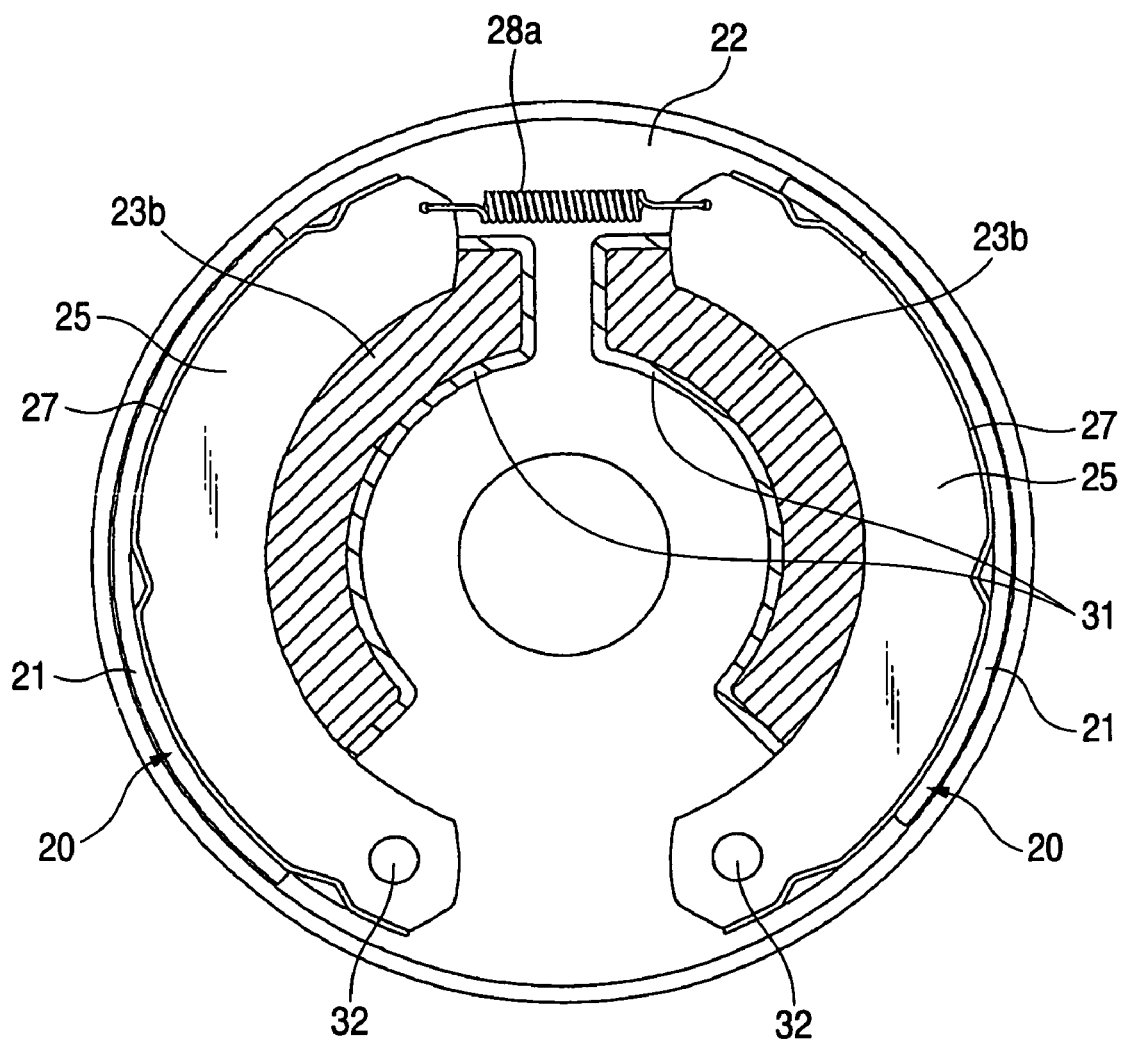
FIG. 8 is a substantially front view showing the sixth embodiment of the present invention.

Next, FIG. 8 is a view showing the sixth embodiment of the present invention. In this embodiment, end portions of a pair of brake shoes 20, 20 are pivotally supported by the shafts 32, 32 so that the pair of brake shoes 20, 20 can be freely oscillated with respect to the backing plate 22. Other points of the structure and the action are the same as those of the fifth embodiment described before.

In this connection, when the present invention is applied to a drum brake, it is possible to apply the present invention not only to the leading trailing type drum brake but also to the two leading type drum brake or the duo-servo type drum brake.

Seventh Embodiment

Figure 9:
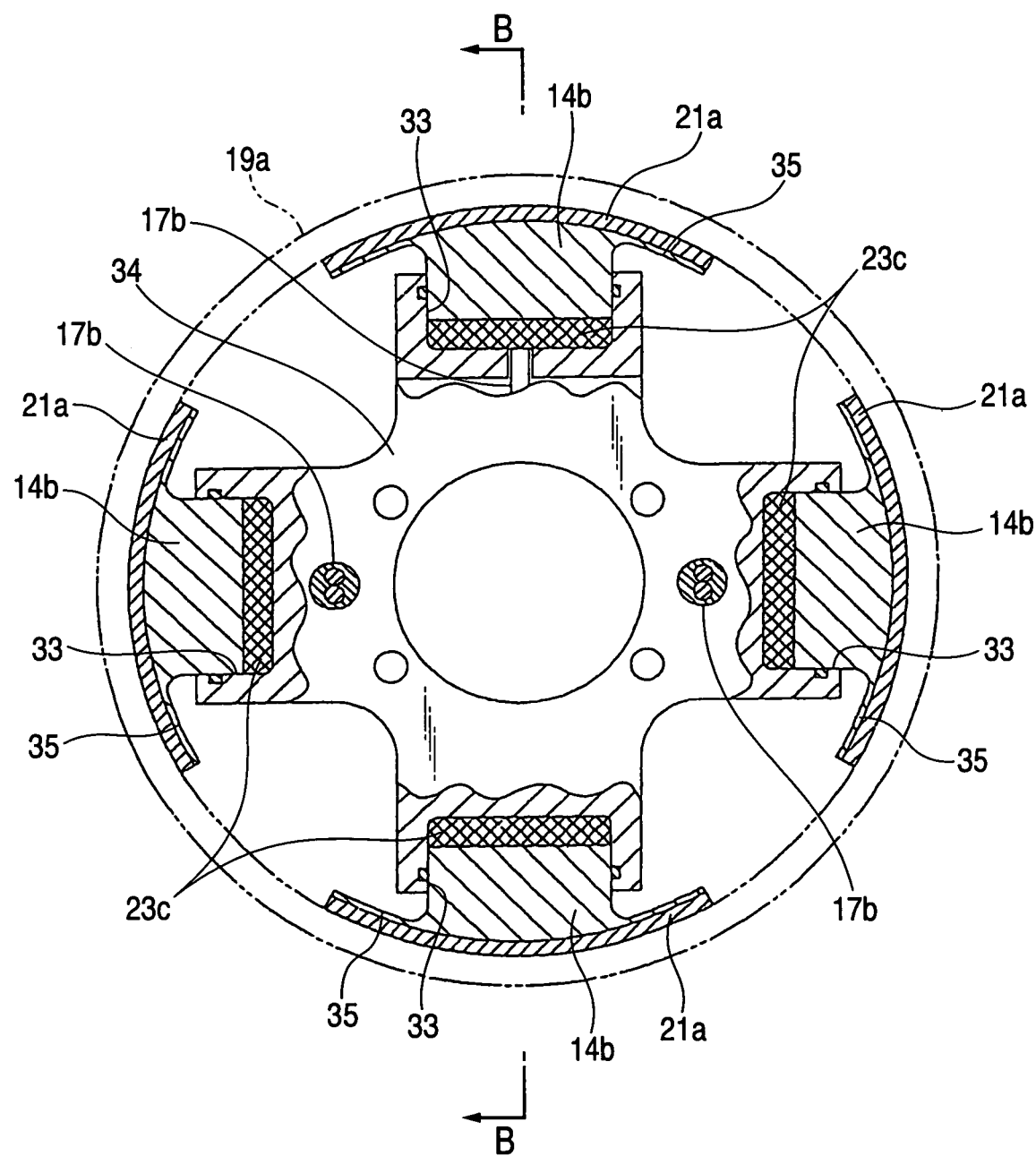
FIG. 9 is a partially cutaway front view showing the seventh embodiment of the present invention.
Figure 10:
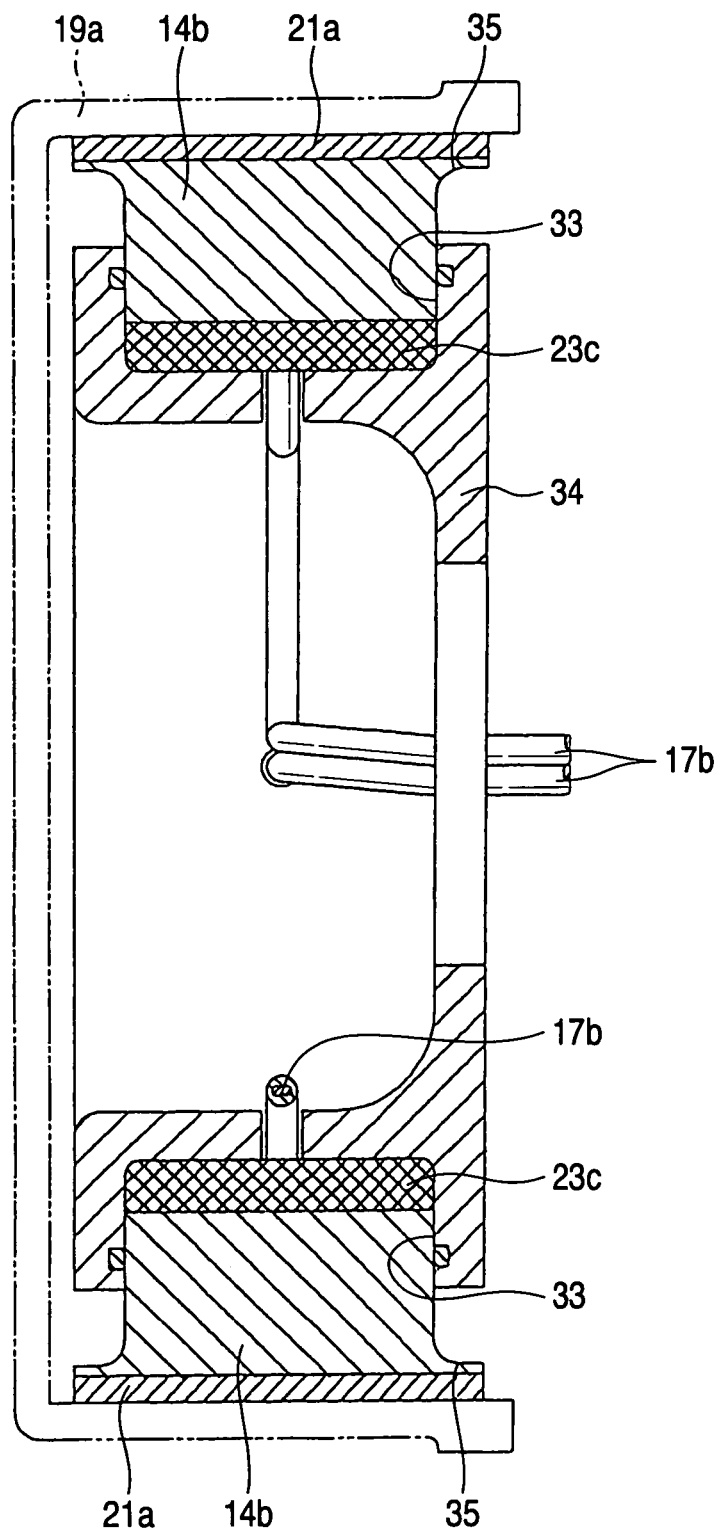
FIG. 10 is a sectional view taken on line B-B in FIG. 9.
Figure 11:
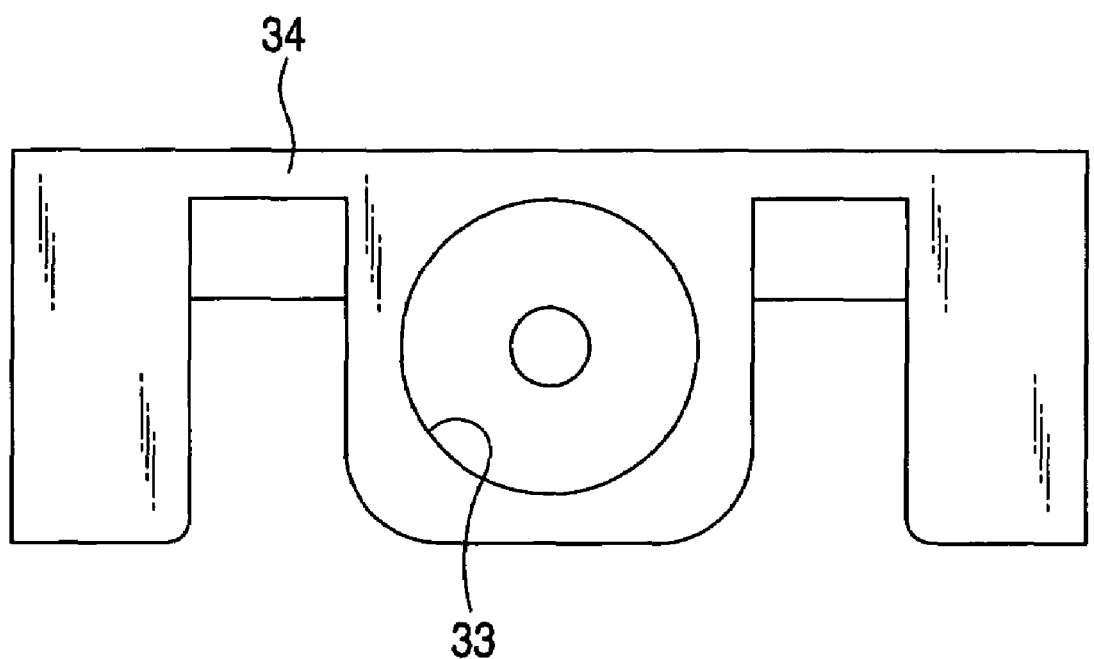
FIG. 11 is an upper view of FIG. 9 in which the friction member and the piston are omitted.
Figure 12:
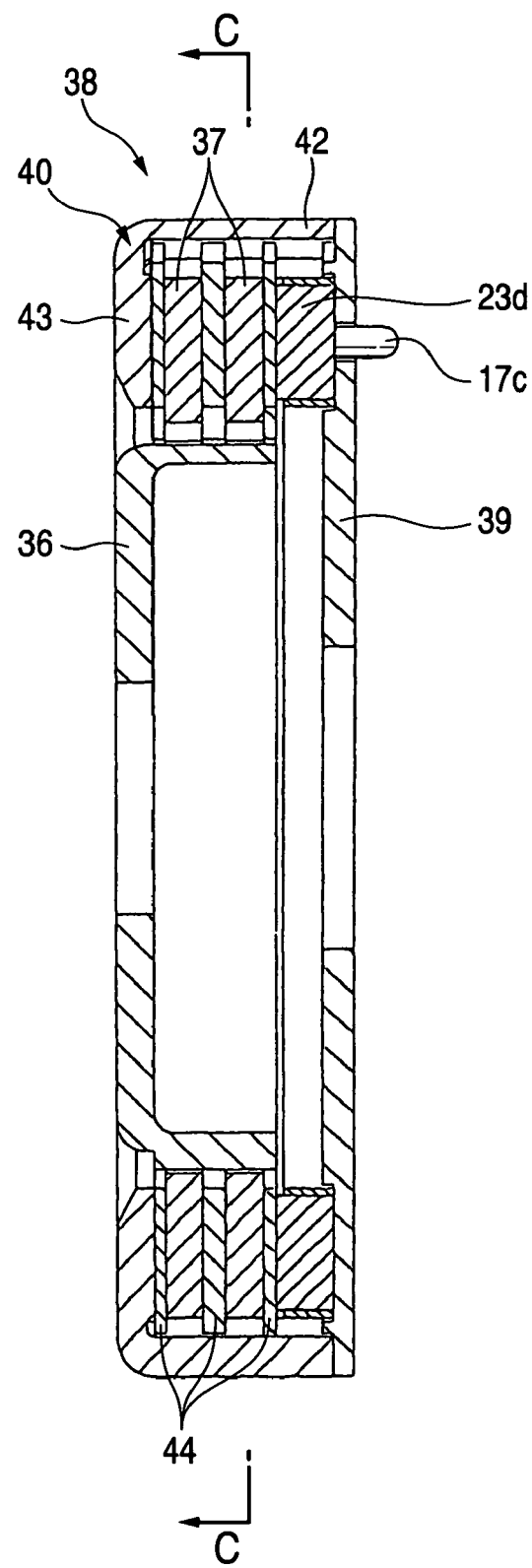
FIG. 12 is a sectional view showing the eighth embodiment of the present invention.
Figure 13:
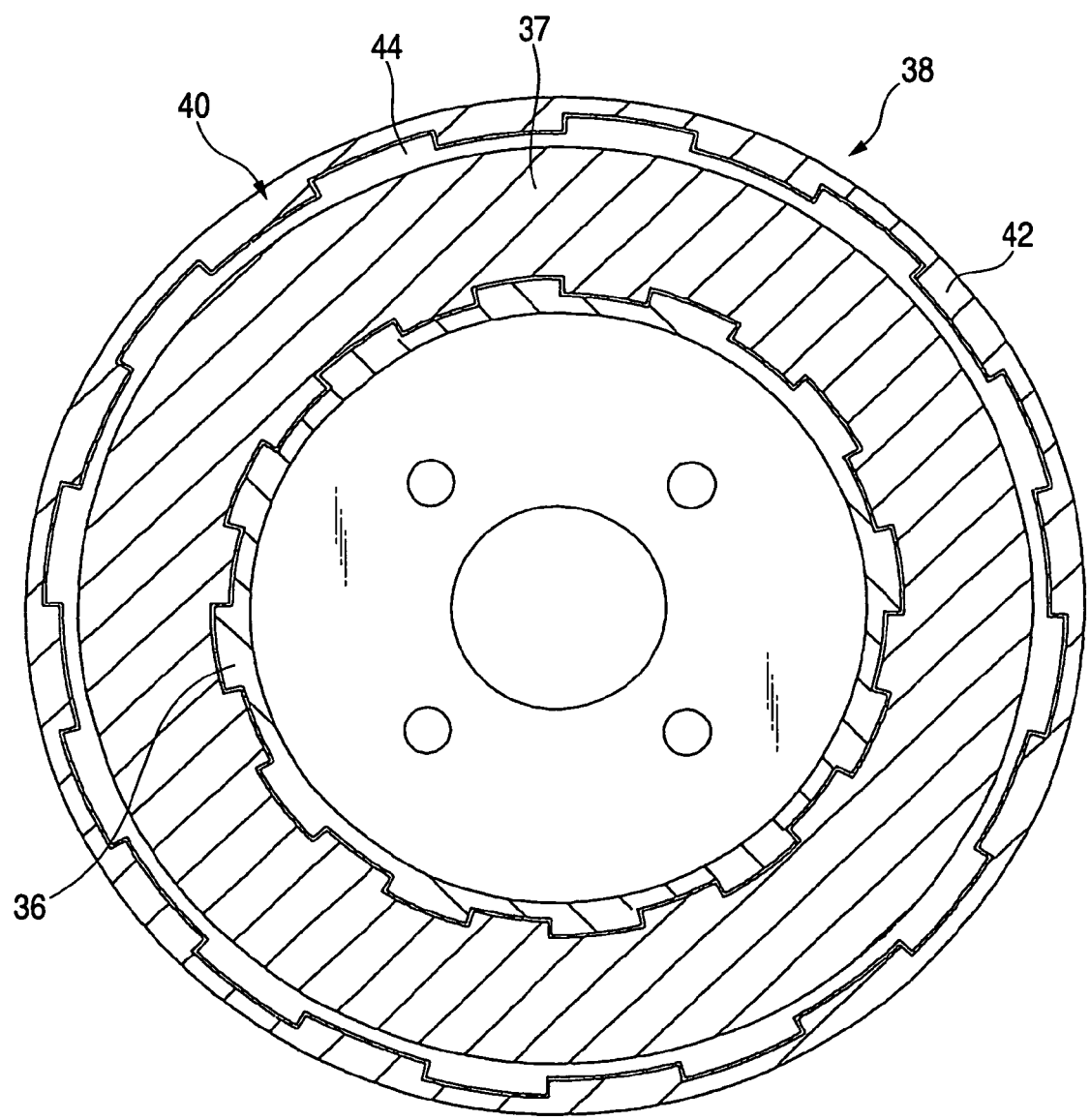
FIG. 13 is a sectional view taken on line C-C in FIG. 12.
Figure 14:
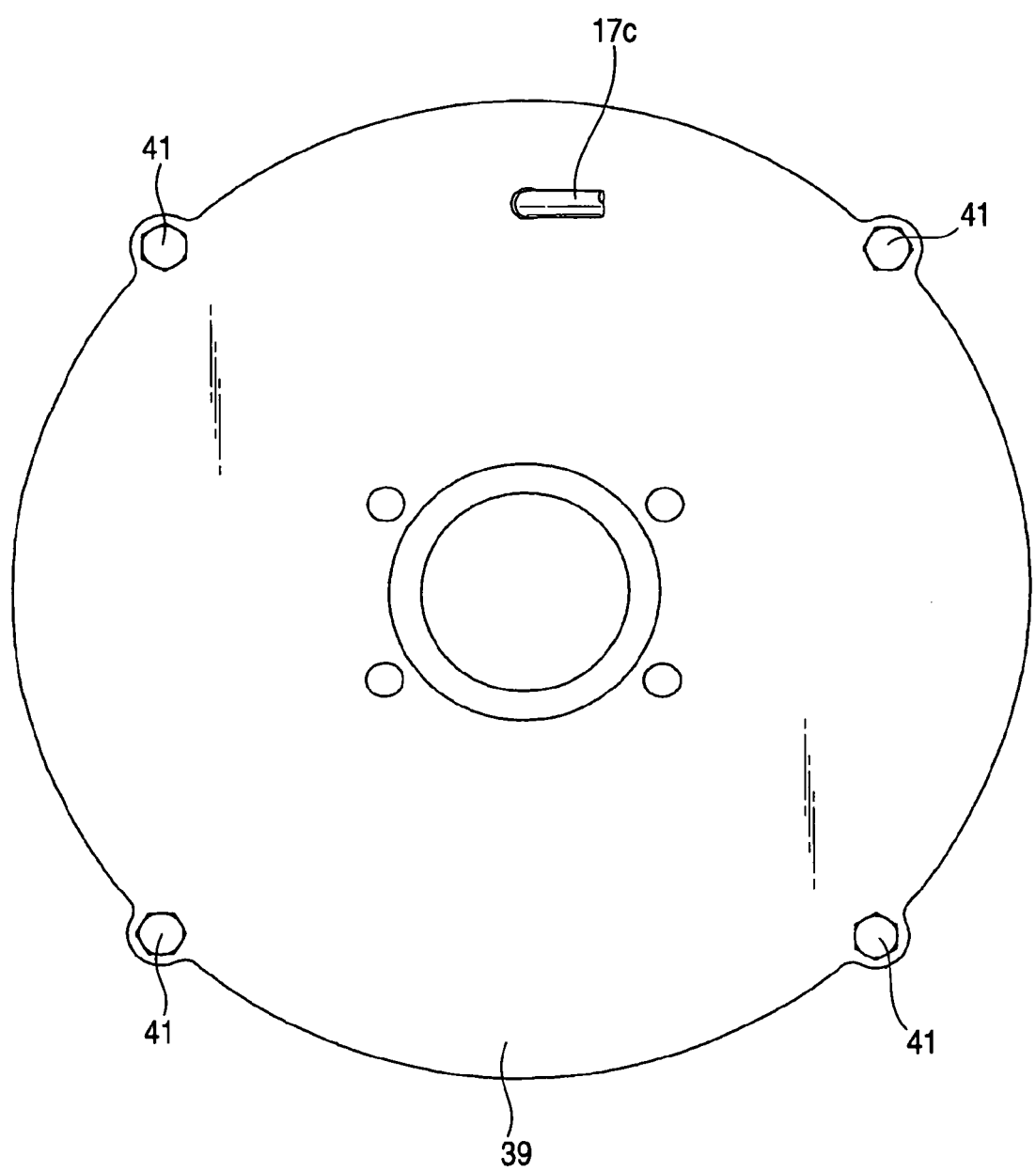
FIG. 14 is a view taken from the right in FIG. 12.

Next, FIGS. 9 to 11 are views showing the seventh embodiment of the present invention. In this embodiment, since a plurality of combinations of the friction members and the cylinders are provided, even when a pushing force generated by the actuator 23c made of electroactive polymer is not sufficiently high, it is possible to obtain a high intensity of braking force. In this embodiment, the rotor for braking is the drum 19a having a bottom portion concentrically connected and fixed to a wheel. The shape of the drum 19a is the same as that of a drum composing a common drum brake. In this embodiment, inside the drum 19a in the radial direction, a plurality of cylinders 33, 33 are arranged at regular intervals in the circumferential direction of the drum 19a under the condition that the center lines of the individual cylinders are made to coincide with the radial direction of the drum 19a. Therefore, a high intensity of braking force can be obtained in a well balanced condition. The base plate portion 34, to which the base end portions of the cylinders 33, 33 are connected and fixed, are supported and fixed to a vehicle body (suspension not shown) being concentrically arranged with the drum 19a.

The pistons 14b, 14b are respectively engaged in the cylinders 33, 33 in such a manner that the pistons 14b, 14b can be freely displaced in the axial directions of the cylinders 33, 33. An arcuate backing plate portions 35, 35 are provided in portions of the cylinders 33, 33 protruding from the outer opening portions. The arcuate friction members 21a, 21a are attached to the outer circumferential faces of these backing plate portions 35, 35. In this connection, in the embodiment shown in the drawing, each piston 14b, 14b is integrated with each backing plate portion 35, 35 into one body. However, the piston and the liner portion may be formed differently from each other. The friction members 21a, 21a are opposed to the inner circumferential face of the drum 19a. The actuator 23c, 23c made of electroactive polymer is arranged between the inner end face of each cylinder 33, 33 and the inner end face of each piston 14b, 14b. An electric current is freely supplied to the electroactive polymer composing each actuator 23c, 23c via the cable 17b, 17b. Therefore, the thickness of each actuator 23c, 23c in the radial direction of the drum can be freely adjusted.

In this embodiment composed as described above, at the time of not applying the brake, no electric current is supplied to the electroactive polymer composing each actuator 23c, 23c, and the thickness of each actuator 23c, 23c is reduced.

In this state, each piston 14b, 14b is displaced inward in the radial direction of the drum 19b by an elastic force of a return spring not shown. Therefore, the inner circumferential face of the drum 19b and the outer circumferential face of each friction member 21a, 21a are separated from each other.

On the other hand, when the electroactive polymer composing the actuator 23c, 23c is electrified so as to apply the brake, the thickness of each actuator 23c, 23c is synchronously expanded. As a result, each friction member 21a, 21a is displaced in the radial direction of the drum 19a, and the inner circumferential face of the drum 19a and the outer circumferential face of each friction member 21a, 21a come into contact with each other. As a result, the brake is applied according to the friction caused between each friction member 21a, 21a and the inner circumferential face of the drum 19a. In this connection, in the embodiment shown in the drawing, the number of combinations of the cylinders 33, 33 and the pistons 14b, 14b is four. However, it should be noted that the number of combinations of the cylinders 33, 33 and the pistons 14b, 14b is not limited to the above specific embodiment. When it is composed that the drum 19a is pinched from the inside and the outside of the drum 19a, it is possible to adopt the structure in which only one set of the cylinder and the piston are arranged. However, when consideration is given to the balance in the case of applying the brake, it is preferable that a plurality of sets of the cylinders and the pistons are arranged in the circumferential direction at regular intervals.

Eighth Embodiment

Next, FIGS. 12 to 15B are views showing the eighth embodiment of the present invention. In this embodiment, since a plurality of combinations of the friction members and the cylinders are provided, even when a pushing force generated by the actuator 23d made of electroactive polymer is not sufficiently high, it is possible to obtain a high intensity of braking force. When a plurality of rotors for braking and friction members are put on each other in the axial direction, an intensity of the braking force is enhanced by the friction of the rotors and friction members.

In this embodiment, on the outer circumferential face of the member to be braked 36, which is concentrically connected and fixed to a wheel, a plurality of plates 37, 37 to be braked are provided being supported in such a manner that the plurality of plates 37, 37 can be rotated synchronously with the member to be braked 36 and also the plurality of plates 37, 37 can be displaced in the axial direction of the member to be braked 36. These plates 37, 37 are respectively formed into a ring-shape. The shape of the outer circumferential edge is circular and the shape of the inner circumferential edge is a spline-shape, the pitch of the grooves of which is rough. The inner circumferential edge portions of the plates 37, 37 are spline-engaged with the protruded and recessed portion formed on the outer circumferential face of the rotor 36 to be braked in such a manner that the plates 37, 37 can be freely displaced in the axial direction.

A housing 38 not rotated is arranged at a position in the periphery of the member to be braked 36 so that the plates 37 are surrounded from both sides of the plates 37. The base end portion of the primary portion 40, the cross section of which is an L-shape, is fixed to the outer circumferential end portion of one face (the left face in FIGS. 12 and 15) of the ring-shaped base plate portion 39 by a plurality of connecting members 41, 41. This primary portion 40 is composed of a cylindrical portion 42 and a pressure plate portion 43 which is bent from the forward end portion of this cylindrical portion 42 to the inside in the radial direction. When the brake device is installed in a vehicle, this primary portion 40 is supported and fixed to a vehicle body (suspension not shown) so that the primary portion 40 can not be rotated. On the inner circumferential face of the cylindrical portion 42, the spline-shaped protrusions are formed by a rough pitch. In this case, the spline engagement is made so that the protrusions and the plurality of friction plates 44, 44 can not be relatively rotated and further a displacement in the axial direction can be allowed.

Each friction plate 44, 44 is composed of a single body of the friction member. Alternatively, each friction plate 44, 44 is composed in such a manner that the friction member is attached onto one side of the core member, which is provided for enhancing the mechanical strength and the rigidity and opposed to each plate 37, 37 to be braked. The shape of the inner circumferential edge is circular and the shape of the outer circumferential edge is a spline-shape, the pitch of which is rough. The above friction plates 44, 44 and the above plates 37, 37 to be braked are alternately arranged in the axial direction. In the example shown in the drawing, when three friction plates 44, 44 and two plates 37, 37 to be braked are alternately arranged, the friction plates 44, 44 are arranged at both end portions in the axial direction. Of course, the number of the friction plates 44, 44 can be increased and decreased together with the number of the plates 37, 37 to be braked. One friction plate 44 (the friction plate on the left in FIGS. 12 and 15) is made to come into contact with the inside of the pressure plate 43, and the other friction plate 44 (the friction plate on the right in FIGS. 12 and 15) is made to come into contact with one face of the actuator 23*d*. This actuator 23*d* is made of electroactive polymer and formed into a ring-shape. When an electric current is supplied via the cable 17*c*, the thickness of the housing 38 in the axial direction (the lateral direction in FIGS. 12 and 15) can be freely adjusted.

Figure 15A:
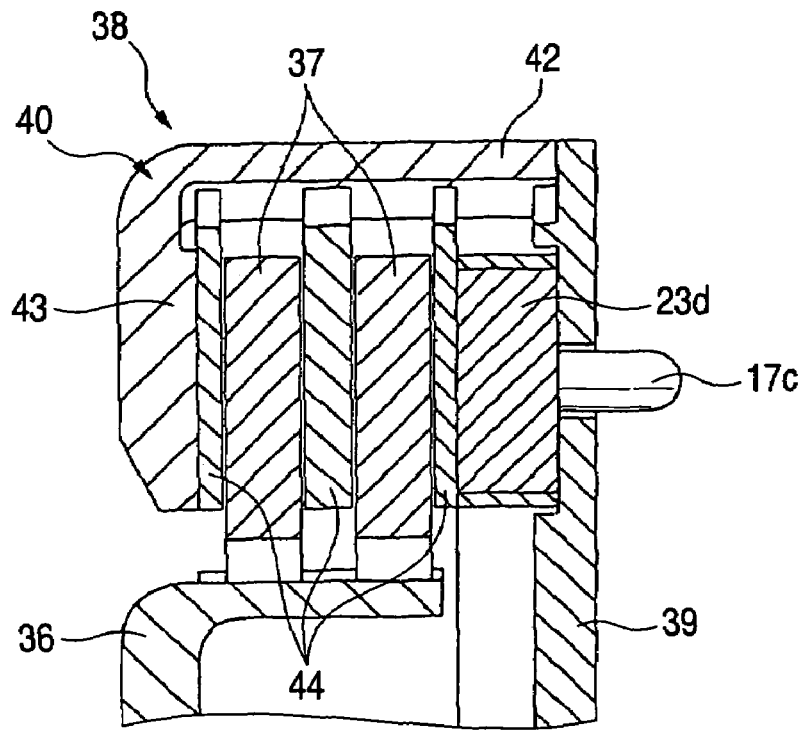

In this embodiment composed as described above, at the time of not applying the brake, the electroactive polymer composing each actuator 23*d* is not electrified. Therefore, the thickness of this actuator 23*d* is contracted. In this state, as shown in FIG. 15A, a gap is formed between the side of each friction plate 44, 44 and the side of each plate 37, 37 to be braked. Therefore, no braking force is given to a wheel to which the rotor 36 to be braked is connected and fixed.

Figure 15B:
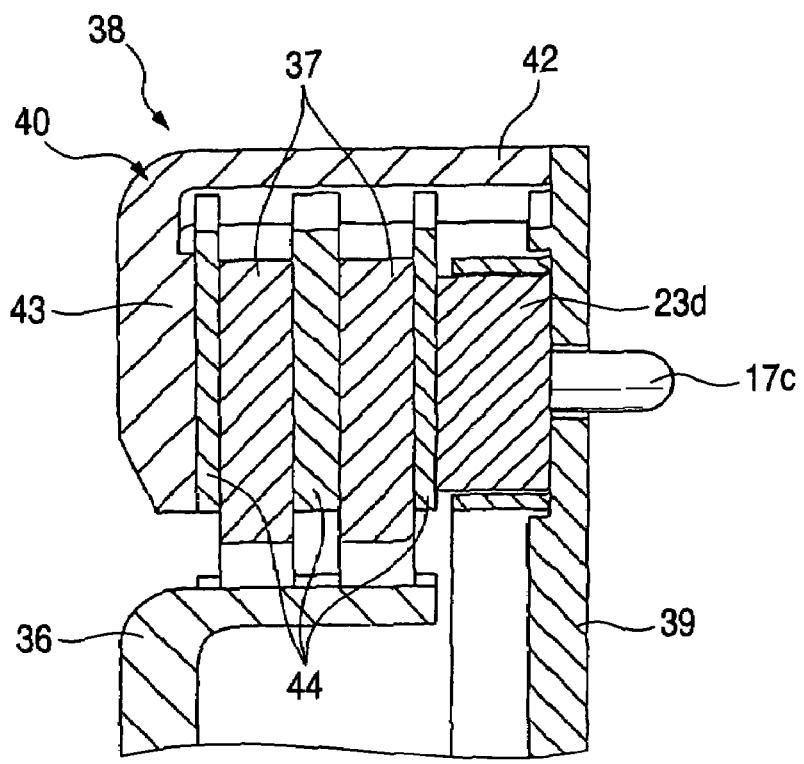

On the other hand, when the electroactive polymer composing the actuator 23*d* is electrified in order to apply the brake, the thickness of the actuator 23*d* is expanded. As a result, as shown in FIG. 15B, the side of each friction plate 44, 44 and the side of each plate 37, 37 to be braked come into contact with each other. According to the frictional force given between both plates 44, 37, the wheel is given a braking force. Numbers of both the plates 44, 37 can be increased. Therefore, even when an intensity of the pushing force generated by the actuator 23*d* is not sufficiently high, it is possible to obtain a sufficiently high intensity of braking force.

Ninth Embodiment

Figure 16A:
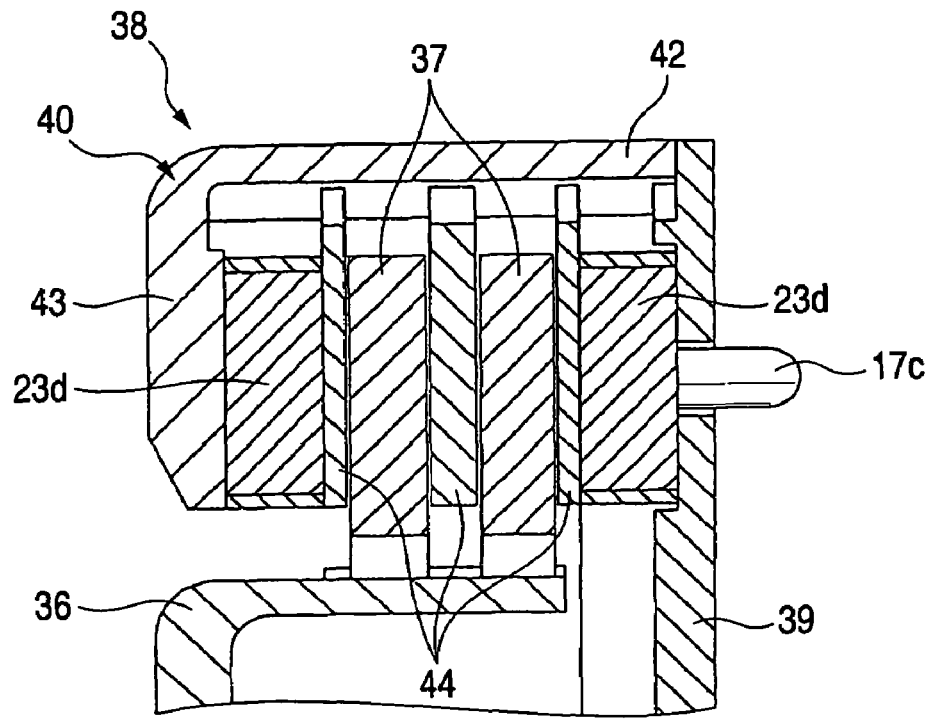
Figure 16B:
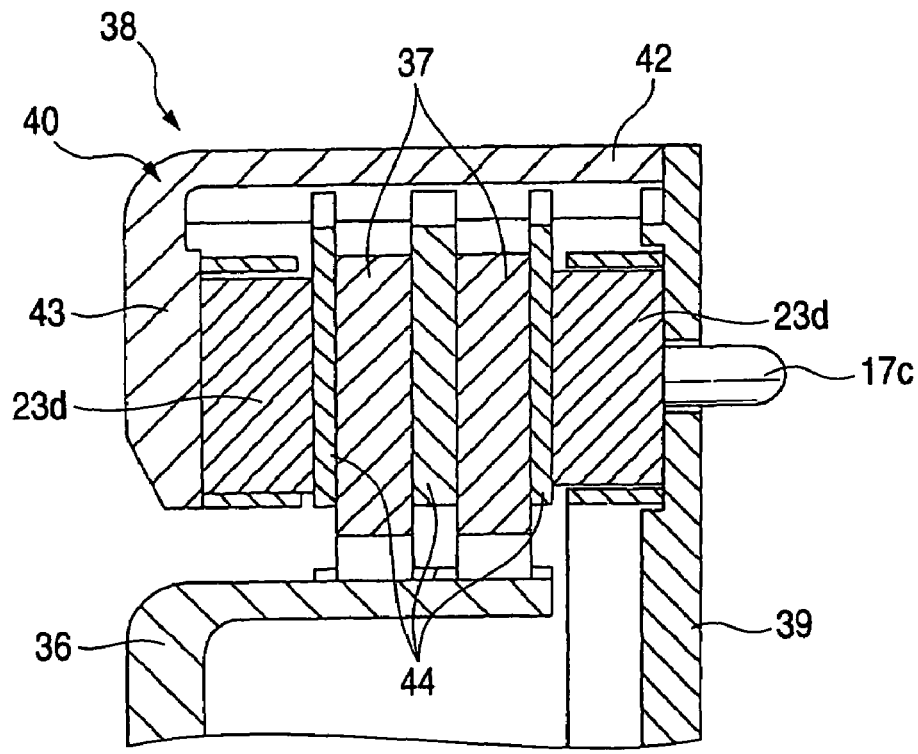

In this connection, in order to maintain a displacement in the axial direction between each friction plate 44, 44 and each plate 37, 37 to be braked, as shown in FIGS. 16A and 16B in which the ninth embodiment of the present invention is illustrated, it is possible to provide the actuator 23, 23 not only between the base plate portion 39 and the friction plate 44 on one end side but also between the pressure plate 43 and the friction plate 44 on the other end side. Further, although not illustrated in the drawing, instead of arranging the actuator between the pressure plate 43 and the friction plate, the actuator may be arranged between them and also arranged between the friction plates.

Since the electric brake device of the present invention is composed and activated as described above, it is possible to realize a compact and highly effective electric brake device capable of obtaining a sufficiently high intensity of braking force.

What is claimed is:

1. An electric brake device comprising:
   a rotating member for rotating together with a wheel, wherein the rotating member comprises a cylindrical drum having a bottom;
   a friction member opposed to an inner circumferential face of the drum;
   an electric actuator for pressing the friction member to a braking surface of the rotating member, wherein the electric actuator includes an electroactive polymer in which a shape of an elastomer is changed by electric energy;
   a backing plate arranged on an opening portion side of the drum;
   a brake shoe arranged on the backing plate and having the friction member, wherein the brake shoes can be freely displaced in the radial direction of the drum; and
   a portion for fixing the electroactive polymer to the backing plate arranged in a portion closer to the center than the inner circumferential edge of the pair of brake shoes,
   wherein the electroactive polymer is arranged between an outer circumferential face of the portion for fixing the electroactive polymer and an inner circumferential edge of the pair of brake shoes;
   wherein an outside surface of the electroactive polymer is tangential to the inner circumferential edge of the pair of brake shoes along the electroactive polymer's length.

2. An electric brake device comprising:
   a rotating member for rotating together with a wheel, wherein the rotating member comprises a cylindrical drum having a bottom;
   a friction member opposed to an inner circumferential face of the drum;
   an electric actuator for pressing the friction member to a braking surface of the rotating member, wherein the electric actuator includes an electroactive polymer in which a shape of an elastomer is changed by electric energy;
   a cylinder extending from the central side of the drum to the inner circumferential side, and having a bottom; and
   a piston slidably engaged in the cylinder,
   wherein the friction member, having an arcuate shape, is supported by an outer end portion of the piston, and
   the electroactive polymer is arranged between the bottom portion of the cylinder and an inner end face of the piston.

* * * * *